Nov. 16, 1965   M. BITZER   3,217,607
FLUID MOTOR
Filed June 28, 1962   3 Sheets-Sheet 1
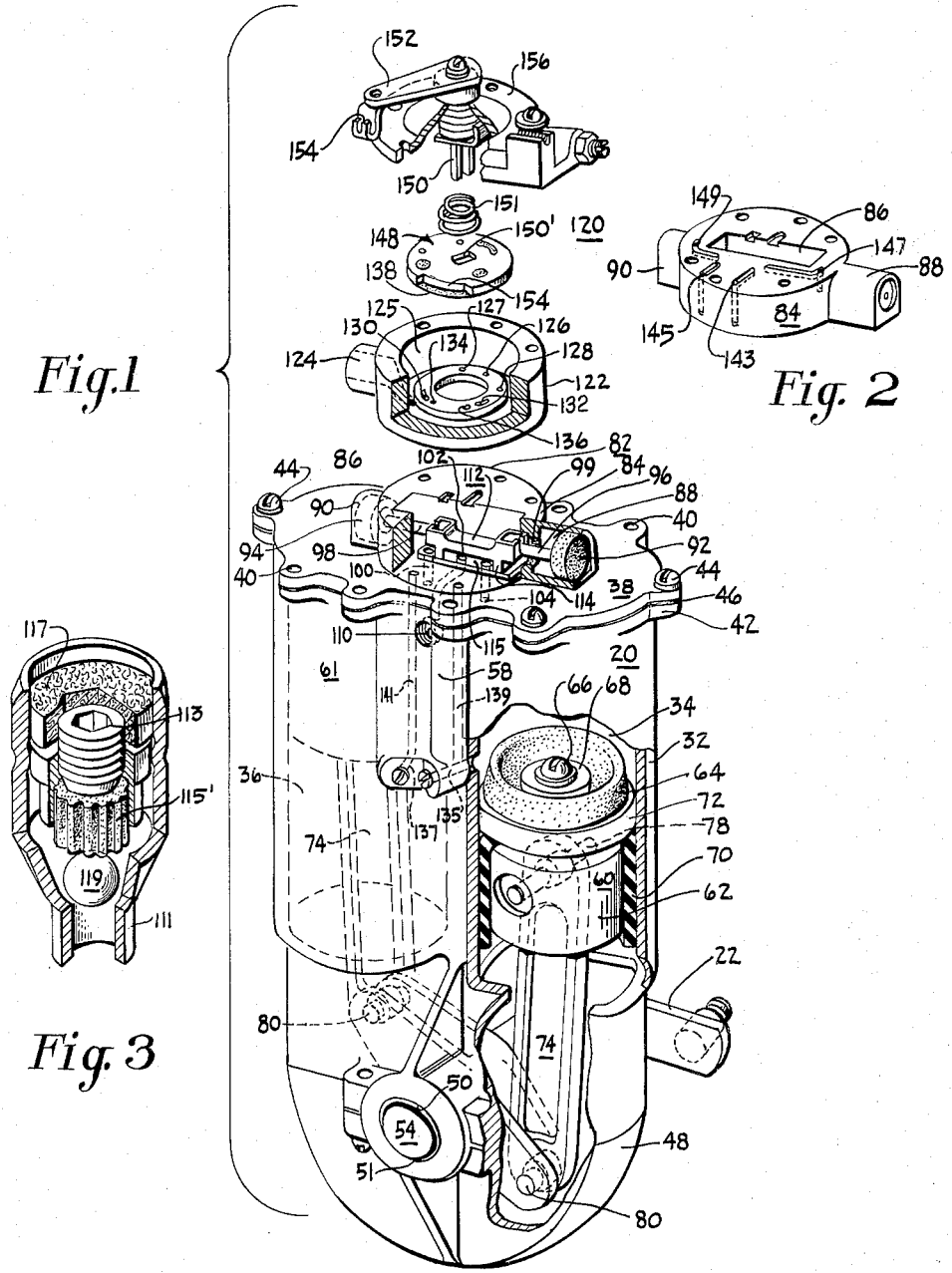
INVENTOR.
MARTIN BITZER
BY E. Herbert Liss
ATTORNEY Nov. 16, 1965  M. BITZER  3,217,607
FLUID MOTOR
Filed June 28, 1962  3 Sheets-Sheet 2
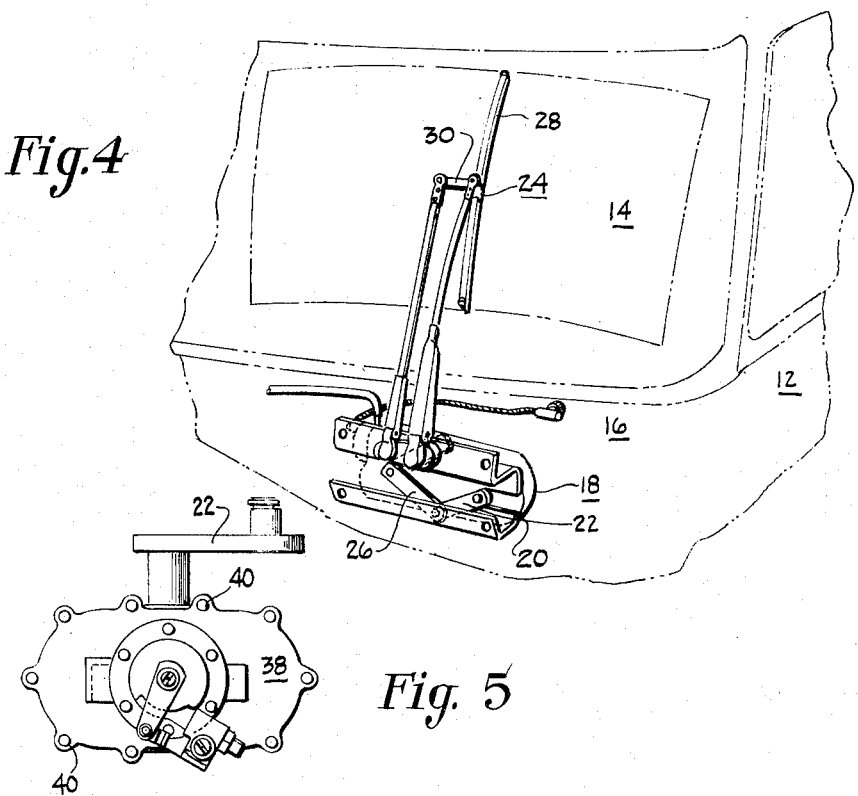
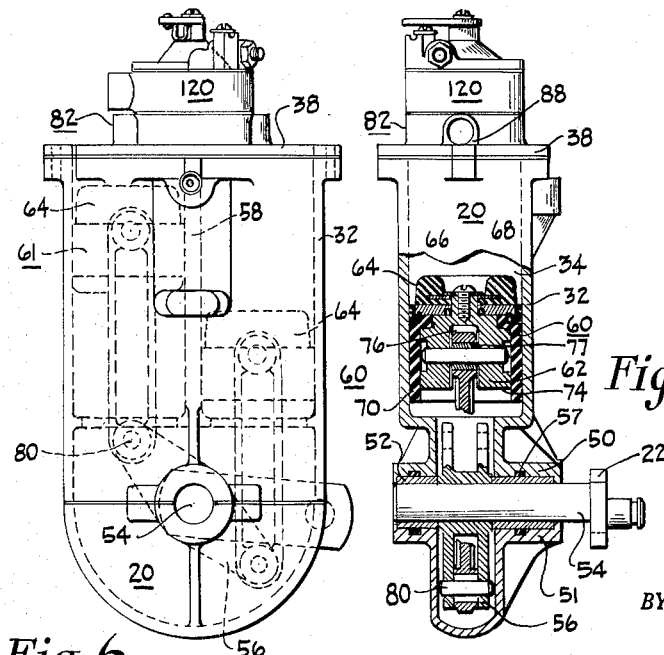
INVENTOR.
MARTIN BITZER
BY E. Herbert Liss
ATTORNEY Nov. 16, 1965   M. BITZER   3,217,607
FLUID MOTOR Filed June 28, 1962   3 Sheets-Sheet 3

INVENTOR.
MARTIN BITZER
BY E. Herbert Liss
ATTORNEY.

3,217,607
FLUID MOTOR
Martin Bitzer, Kenmore, N.Y., assignor to Trico
Products Corporation, Buffalo, N.Y.
Filed June 28, 1962, Ser. No. 205,943
3 Claims. (Cl. 91—178)

The present invention relates to fluid motors, and more, particularly, to a fluid motor for a windshield wiper for use in heavy duty applications. In large vehicles having a large area of windshield, a long, heavy arm and blade is required to properly maintain the windshield. For such duty, high torque motors are required to drive the arm and blade assembly. Whether fluid pressure or other type motors are utilized for this purpose, the torque required results in a large bulky motor. Since space on the cowl or fire wall of a vehicle of this type is rather limited and since this is the usual and most convenient place for the installation of windshield wiper motors, it would be desirable to provide a unique construction of a windshield wiper motor which could deliver the required torque yet utilize less space than motors known heretofore for this purpose.

When a heavy, long wiper arm and blade assembly is driven by a motor delivering relatively high torque, balancing of the piston in a fluid pressure motor is especially important. Careful control is required to balance the differential pressure between the pistons. Heretofore in known types of heavy duty motors, a pair of pistons were aligned longitudinally for reciprocal movement. This required unsymmetrical air passages to the respective cylinders. In order to receive an even response from each piston and to more readily balance the power delivered by the piston, it is desirable to have air passages of the same length and diameter to each of the cylinders. It has been necessary, in the tandem or longitudinally aligned piston type of heavy duty motor, to use passages of different diameters to compensate for the variations in the length. This, however, results in a more costly manufacturing process.

Another requirement particularly important in a heavy duty motor is a natural slowdown at the end of a stroke to avoid noisy reversal impact which often occurs with a tandem type heavy duty motor. A natural slowdown provides a smoother reversal.

Another desirable feature in a windshield wiper motor is a parking arrangement whereby the blade and arm are parked slightly out of a range of operation to provide better visibility when the wiper is not in operation.

Thus, as pointed out in detail hereinabove, the desirable features of heavy duty motors are:

(1) Compactness;
(2) Balanced power delivered to each of the pistons;
(3) Symmetrical air passages of the same length to both cylinders;
(4) A natural slowdown at the end of a stroke;
(5) Smooth operation at reversal; and
(6) Out of range parking.

Therefore, the principal object of the present invention is to provide an improved heavy duty fluid pressure motor of simple construction and relatively few parts for windshield wipers which is compact and is of smaller length than known motors of equivalent capacity.

Another object of the invention is to provide an improved fluid pressure motor for windshield wipers which has symmetrical passages of the same length and diameter to each of the cylinders.

A further object of the invention is to provide an improved fluid motor for windshield wipers in which there results a natural slowdown and smooth reversal of the wiper arm.

A still further and more specific object of the invention is to provide an improved fluid motor for windshield wipers which has a pair of chambers located in side by side relation for compactness and utilizes the fluid pressure source for initiating a rotation of the power output shaft, as well as for effecting reversal of the shaft and which utilizes spent fluid for balancing pressure differential upon reversal.

Other objects and advantages of the invention will be apparent from the following detailed description taken in connection with the accompanying drawings in which:

FIG. 1 is a perspective view of the motor of this invention partly in section including an exploded view of the control valve;

FIG. 2 is a perspective view of the reversing valve housing employed in this invention;

FIG. 3 is a perspective view partly in section illustrating a metering valve used in the exhaust portion;

FIG. 4 is a partial view of a vehicle having a windshield cleaner mounted thereon which embodies the motor of this invention;

FIG. 5 is a top elevational view of the motor of this invention;

FIG. 6 is a front elevational view of the invention;

FIG. 7 is a side elevational view partly in section illustrating the invention;

Figure 9:
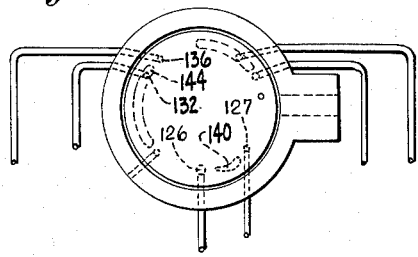
FIG. 9 is a schematic view of the invention showing the disposition of the parts in parking position.

Referring now to the drawings, FIG. 4 illustrates a portion of a vehicle 12 having a windshield 14 and a body portion 16 which may be the cowl or fire wall of the vehicle. Mounted on the body portion 16 is a windshield cleaner 18 having a fluid motor 20 which may be mounted on the body portion 16 by a bracket 22. A windshield wiper assembly 24 is mounted on the motor 20 and is driven by the motor through a linkage 26. The wiper assembly includes a wiper blade 28 and a parallel link-type wiper arm 30. The parallel link-type arm 30 is employed to provide substantially linear motion of the wiper blade 28 across the windshield 14. Although the fluid motor of this invention is shown embodied in a windshield cleaner assembly 18 of the type having a parallel link wiper arm assembly 30, it will of course be understood that the fluid motor of this invention may be employed with any type of oscillatable windshield cleaner and may have uses in equipment other than windshield cleaners.

The motor 20, best shown in FIGS. 1, 5, 6, and 7, includes a motor housing 32 having a pair of motor chambers or cylinders 34 and 36 disposed in side by side relationship. Although the cylinders or chambers 34 and 36 are shown aligned with their axes aligned parallel to each other, in accordance with the broader aspects of this invention, the cylinders 34 and 36 may be at an angle to each other which preferably would be less than 90 degrees. The housing is closed at its upper end, as seen in FIG. 1, by a substantially flat cover plate 38 which conforms in shape to the upper end of the motor housing. The cover plate has a plurality of lugs 40 about its periphery which are in alignment with a plurality of lugs 42 disposed about the periphery of the upper end of the motor housing 32. The lugs 40 and 42 have openings which are disposed in alignment with each other and the openings in the housing lugs 42 may be threaded to receive screws 44 for securing the cover plate 38 to the housing 32. A gasket 46 may be interposed between the cover plate and the upper end of the housing to provide good sealing engagement. Although the cover plate 38 is shown and described as being secured to the housing by screws 44, it will of course be understood that any suitable fastening or securing means may be employed. The lower end of the housing 32 is closed by a linkage housing 48 of semi-circular section. The lower portion of the housing 32 and the upper portion of the linkage housing 48 have centrally located semi-circular bearing seats 50 and 51 which form a housing for output shaft bearing 52. Journaled in the output shaft bearing 52 is an output shaft 54 having secured intermediate its ends, either integrally, by press fit, welding, or any suitable means, a rocker arm or walking beam 56. The bearing 52 may be lubricated by any suitable means as, for example, a lubricant-saturable pad 57 as shown. Disposed intermediate the cylinders 34 and 36 is a common wall 58 to separate the cylinders and to provide structure for fluid passages as will be hereinafter described in detail.

Disposed in the cylinders 34 and 36, respectively, are piston assemblies 60 and 61. Since the piston assemblies are identical in construction, for purposes of simplification and clarity, only the construction of piston 60 will be described in detail. The piston assembly includes a cylindrical body 62 of suitable material such as steel or aluminum having secured to its upper end a disc-like bumper 64 of rubber or other suitable resilient material. The bumper 64 is secured to the body 62 by any suitable means as, for example, a screw 66 and a washer 68. A sleeve 70 of suitable material, preferably a plastic or other synthetic resin comprising in its composition graphite, molybdenum sulfide, or other suitable lubricating material, is provided on body 62 to engage the side walls of the cylinder 34. A piston 72 of rubber or other suitable material engages the piston head or body 62 in sealing engagement and in sealing engagement with the side walls of the cylinder chamber 34. A piston rod 74 is received in a piston rod slot 76 opening at the lower end of the piston body 62 and is pivotally secured to the piston body 62 on a pin 78 extending transversely through the piston body 62, the slot 76 and an opening 77 in the upper end of the piston rod 74. The slot 76 is larger than the end of the piston rod 74, positioned therein, so as to provide ample space for pivotal movement. The piston rod 74 fits loosely on the pivot pin 78. The piston assembly 61 is of identical construction and has an identical piston rod 74 secured to the piston 61 in an identical manner. The ends of the piston rods 74 remote from the pistons 60 and 61 are pivotally secured to the opposite ends of the rocker arm or walking beam 56 by pivot pins 80 as seen in FIGS. 1, 6 and 7.

Thus, a motor assembly has been described having a pair of pistons, each disposed within a cylinder for axial reciprocal motion drivingly connected through pivotal linkage to an oscillatable output shaft 54. The pistons 60 and 61 are preferably actuated by fluid and, in a more specific aspect of the invention, by a compressible fluid as, for example, air or other compressible gases.

A unique system of dual porting is provided for utilizing a single fluid source for furnishing thrust for the pistons, for differential pressure balancing, and for initiating reversal of the pistons. This is accomplished by utilizing a unique reversing valve assembly 82.

The reversing valve assembly is best shown in FIGS. 1 and 2 and is a type of slide valve assembly. The reversing valve assembly 82 includes a housing 84 shown in FIG. 2 having a plurality of ports. The housing 84 may be integral with the cover plate 38 or may be secured thereto as by welding or other airtight engagement. The reversing valve housing 84 has located in its upper surface, as seen in FIG. 2, a valve seat or recess 86 of rectangular section. In longitudinal alignment with the valve seat 86 on each end thereof is a cylinder 88 and a cylinder 90, respectively, having disposed therein a piston 92 and a piston 94, respectively, for axial reciprocal movement. The piston 92 has a stem 96 and the piston 94 has a stem 98 rigidly secured thereto and extending inwardly through sealed fittings 99 and 101 to the recess 86. Extending through the valve seat and cover plate are three ports or fluid passages 100, 102, and 104. The passages 100 and 104 communicate with the cylinders 36 and 34, respectively, and serve as passages for the admittance of fluid to the cylinders 36 and 34 to provide thrust for the pistons 61 and 60, respectively. The opening or port 102 communicates directly with a passage 108 in the common wall 58 of the housing 32. Passage 108 communicates through the wall 58, an exhaust port 110 and a muffler or metering valve 111 with the atmosphere. A slide valve 112 is received in the valve seat 86. Slide valve 112 has a boss 114 which is biased against the bottom of the valve seat 86.

On its lower side, boss 114 has an elongated recess 115 of sufficient length to connect port 100 with port 102 or to connect port 104 with port 102. The slide valve 112 at its ends engages stem 98 of piston 94 and stem 96 of piston 92 for movement therewith. Thus a rigid pneumatically operated slide valve is provided which connects ports 100 and ports 102 at one of its stroke and ports 102 and 104 at the other end of its stroke.

A control valve assembly 120 is mounted on the upper surface of reversing valve assembly 82 as shown in FIGS. 6 and 7. The reversing valve assembly housing 122 is for purposes of convenience, of substantially the same shape and size as reversing valve assembly housing 84 and lies flush thereon. The housing has a plurality of ports, some of which are communicable with ports on the surface of reversing valve housing 82. The control valve housing 122 is in the form of a disc having a large central recess 125. A stem or fluid entrance port 124 is adapted to be connected to a suitable fluid pressure source and admits pressurized fluid into the recess 125 of the housing 122. The control valve housing 122 has extending through its lower wall in communication with slide valve 82 a reversing valve pressurizing port 126 and an exhaust port 128 which extends through the side wall of the housing 122 and communicates with the atmosphere. It also includes a pair of ports 130 and 132 for communication with the piston chambers 88 and 90, respectively, in slide valve assembly 82. Ports 134 and 136 are provided in the control valve housing 122 to provide communication between the cylinders 34 and 36 of the motor and the cylinders 88 and 90 of the reversing valve assembly.

A rotatable valve 138 is seated in the valve housing 122 and includes a port 140 which is adapted to communicate with fluid pressure port 126. Port 140 has a tail portion so that the rate of fluid flow can be varied by varying the opening of port 126 with the tail of port 140. The valve 138 also includes a pair of semi-circular recesses 142 and 144 which are adapted to connect ports 130 and 134 and ports 132 and 136, respectively, to effect communication between the reversing valve cylinders 88 and 90 and the fluid motor cylinders 34 and 36, respectively when the motor is operating. Communication between cylinders 34 and 36 and cylinders 88 and 90 is effected through ports 135 and 137 and passages 139 and 141 in cylinder wall 58, thence through ports 143 and 145 in reversing valve housing 84 to ports 134 and 136 in control valve 120, through recesses 142 and 144, ports 130 and 132 and through ports 147 and 149 in slide valve housing 84 to cylinders 88 and 90.

A port 146 is provided in the rotating valve 138 to assist in moving the wiper arm to the out-of-range parking position as will be hereinafter explained. The recess 144 in valve 138 in the parking position is arranged so as to connect exhaust port 128 and port 132 to exhaust cylinder 90. A valve operating plate 148 engages and abuts valve 138 for movement therewith. A valve stem 150 drivingly engages a valve operating plate 148 as by connection with a non-circular opening 150' and has at its free end an operating lever 152. The operating plate 148 has a semi-circular peripheral notched portion 154 which engages a projection, not shown, extending radially into the valve seat or recess 125 for limiting the movement of valve 138. Movement of lever 152 drives the operating plate 148 to move the valve 138 from the running to the stopping position and vice versa. Lever 152 has mounted at its end thereon a bracket 154 to which any suitable operating wire or rod may be connected for operating the control valve 120 from a remote point in a vehicle or other apparatus on which this motor may be employed. The stem 150 extends through a valve cover plate 156 which is sealingly secured to the housing which encloses the control valve housing 122. Cover plate 156 is secured to the housing as by bolting or any other suitable connecting means which will provide a fluid-tight seal.

Figure 10:
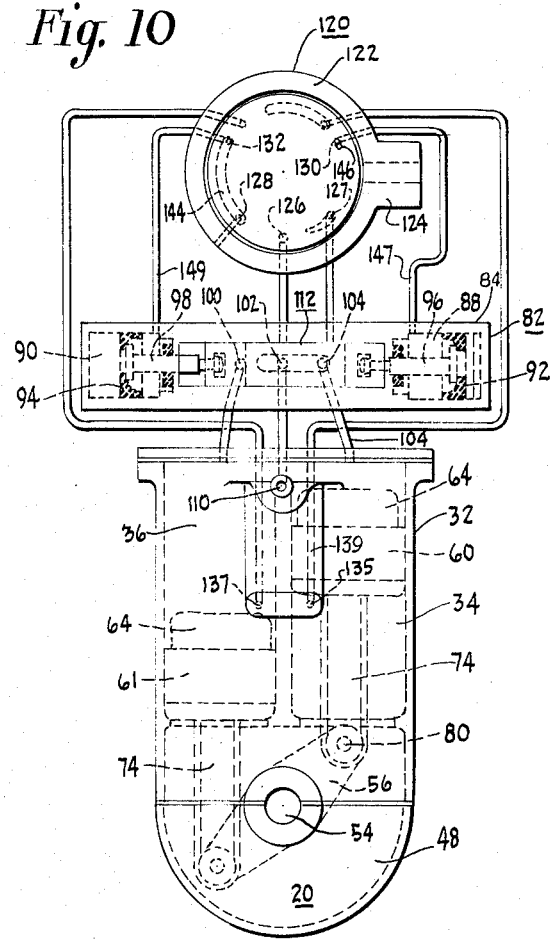
FIG. 10 is a schematic view similar to FIG. 8 showing the disposition of parts intermediate the parking and running position.
Figure 8:
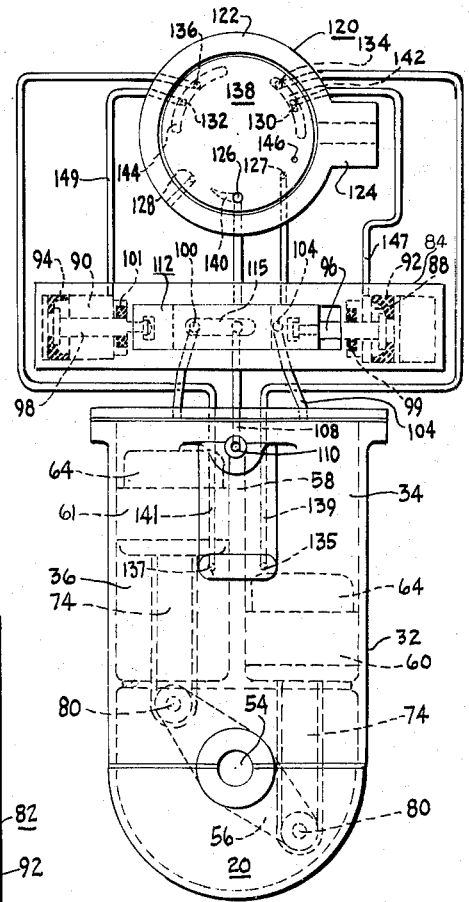
FIG. 8 is a schematic diagram of the motor of this invention showing the disposition of the parts in running position.

In the fully parked or neutral position, the control valve is positioned as shown in FIG. 9 wherein the valve port 140 lies intermediate a port 127 in control valve housing 84 and port 126. The recess 144 overlies port 132 and seals it from port 136. The recess 142 overlies port 130 and seals it from port 134. Thus, although the control valve housing may be pressurized, there is no further communication between it and the reversing valve. To operate the motor, the control valve 138 is moved to the running position shown in FIG. 8. Pressurized fluid is admitted through sleeve 124 and pressurizes the reversing valve housing 84 through port 126. As seen in FIG. 8, the motor is in position where it is about to reverse. Piston 60 has just been displaced below a port 135 to open the port 135 and place it in communication through passage 139 and port 143 with port 134. Through port 134, recess 142, port 130 and passage 147, pressurized air is introduced in cylinder 88 of reversing valve 82 to drive the valve 112 to the right as seen in FIG. 8. This opens port 100 to admit pressurized fluid through passage 109 in cover plate 38 to cylinder 36. This fluid provides thrust for moving left piston 61 downward, as seen in FIG. 8, rotating the rocker arm 56 counterclockwise, thereby driving piston 60 upwards. This compresses the fluid in cylinder 34 and drives it through air port 104. It should be recalled that the valve 112 is displaced from its position shown in FIG. 8 and is in a position similar to the valve 112 in FIGS. 1 and 10. Thus port 104 is connected with exhaust port 102 by recess 115 in valve 112. The exhausted air passes through port 104 to recess 115 and out of port 102 to the exhaust port 110 and to atmosphere through metering valve or muffler 111. Metering valve or muffler valve 111 is an adjustable flow valve which is designed to retard the exhaust flow through the exhaust port 110. By adjusting the screw 113, the rubber body 115' as well as the felt or fiber body 117 may be compressed and made denser. Further, ball valve 119 may be brought closer to its seal to restrict air flow. When the piston 60 has been displaced upwardly to its extreme position and the piston 61 has been displaced downwardly to its extreme position, which is just below port 137, pressurized air enters port 137 and flows through passage 141 to port 136 which is connected by recess 144 in valve 138 to port 132. The pressurized fluid flows through port 132 and passage 149 to cylinder 90 in reversing valve assembly 82 driving the piston 94 and slide valve 112 to the left as seen in FIG. 8. This opens port 104 to the control valve and pressurized fluid then flows through port 126 and port 104 to the cylinder 34 thereby driving piston 60 downwardly until it again reaches the position shown in FIG. 8. This completes a cycle of operation.

The cycle is repeated until the control valve is moved toward the off position. The lever 152 is moved to its extreme position and held momentarily in this position until the wiper parks. This places the valve in the position seen in FIG. 10, after which time the lever 152 is released and a torsion spring 151 returns it to a final parking position as seen in FIG. 9. In the intermediate position, FIG. 10, port 127 is connected with opening 140 in valve 138, thereby pressurizing the reversing valve assembly 82. The recess 144 connects port 132 with exhaust port 128. Opening 146 in valve 138 connects port 130 with cylinder 88. All other ports in the control valve are closed. Thus the pressurized air enters control valve 120 through entrance passage 124 and pressurizes reversing valve 82 through port 127 in control valve assembly housing 122 and opening 140 in valve 138. Pressurized air enters cylinder 36 to drive cylinder 61 to its down position. Port 137, which communicates with port 136, is dead-ended since port 136 is closed. The air from cylinder 90 enters port 132 of valve 138 through passage 149 and is exhausted through exhaust port 128 via recess 144. Pressurized air entering the passage 124 of control valve assembly 120 enters passage 147 through opening 146 of control valve 138 and port 130 of housing 122 where it is delivered to cylinder 88 driving slide valve 112 to the right in a position seen in FIG. 10. When the lever 152 is released, the spring 151 returns the valve 138 to the fully parked position seen in FIG. 9 thereby closing all of the ports in the control valve. Thus the motor is permitted to remain in the parked position as seen in FIG. 9. Since in the intermediate position, the cylinder 34 is open to exhaust and the cylinder 36 is pressurized, and since the port 136 is closed, the piston 61 is permitted to move to a position somewhat lower than the end of its displaced position in its running state. It can be seen that the rocker arm 56 and shaft 54 have a slightly greater clockwise rotation than would be obtained in the running state of the motor, thereby parking the wiper arm 24 slightly out-of-range.

It should now be apparent that a novel windshield wiper fluid motor has been provided which results in a compact heavy duty motor particularly useful when employed with a compressible fluid source and in which, because of its unique symmetrical construction, includes symmetrical air passages of the same length to both cylinders and in which corresponding air passages for each cylinder are of corresponding length and diameter, thereby providing a balanced wiper power output from each of the pistons. Because of the unique dual porting system in each of the cylinders, smoother operation is obtained at reversal; a natural slowdown at the end of a stroke is obtained because of the metered exhaust from each of the cylinders. A single fluid source provides power for initiating reversal and for providing thrust for the piston. The change in angle between the axis of the pistons and the axis of the crankarm further contributes to the natural slowdown. The novel twin cylinder construction results in one piston acting as a dampener on the exhaust side to give smoother operating reversal which is extremely desirable in heavy duty equipment. The novel motor is rugged, compact and simple in structure. It utilizes a minimum number of parts, includes slightly out-of-range parking by employment of a unique torsion spring on the control valve.

Although a certain specific embodiment has been shown and described for the purpose of illustration, it will of course be understood that in the broader aspects of the invention, numerous modifications and design changes may be made without departing from the scope of the invention. It should be understood that the invention is not limited to the specific embodiment shown and described, but may be otherwise be employed within the scope of the following claims.

What is claimed is:

1. A fluid actuated motor for windshield cleaners, a pair of motor chambers arranged in side by side relationship, a piston disposed in each of said chambers for axial reciprocal movement, a reversing valve assembly including a slide valve and valve seat having a pair of ports each in communication with one of said chambers for selectively admitting and exhausting fluid, said slide valve operable to admit simultaneously fluid to one of said chambers through one of said ports and to exhaust fluid through the other of said ports from the other of said chambers to a common exhaust passage disposed in a wall separating said motor chambers when in one position, and to admit fluid through said other of said ports to the other of said chambers and exhaust fluid through said one of said ports from said one chamber to said common exhaust passage when in another position, passages extending from each of said chambers to said valve assembly for actuating said reversing valve from said one position to said other position in response to a pre-selected piston displacement during the exhaust stroke and fluid metering means in said common exhaust passage.

2. A compressible-fluid actuated motor, a pair of cylinders, a piston disposed in each of said cylinders, each of said pistons drivingly engaging an output shaft for alternately transmitting torque thereto, a reversing valve assembly including a valve housing, a valve seat straddling said cylinders and a pressure responsive valve reciprocable on said valve seat, a first port and a second port each in communication with a respective cylinder, a third port in said valve seat, an exhaust passage intermediate said pair of cylinders connecting said third port to atmosphere, metering means disposed in said exhaust passage, said pressure responsive valve being alternately movable between: a first position where said first port effects communication between one of said cylinders and a fluid pressure source and said second port is in communication with said third port to exhaust the other of said cylinders; and a second position where said second port effects communication between the other of said cylinders and a fluid pressure source and said first port is in communication with said third port to exhaust said one of said cylinders, a pair of passages disposed intermediate said cylinders, each opening at one end in one of said cylinder walls, the other end being in communication with a respective end of said pressure responsive valve to thereby exhaust a portion of spent fluid during the exhaust stroke of each piston to operate said pressure responsive valve after a pre-selected displacement of said piston, said exhaust passage being operable to exhaust the remaining portion of said spent fluid through said metering device, whereby said remaining portion of said fluid serves in a balancing relation to relatively adjust the differential pressure in said cylinders to modify the power output of the motor by controlling the elasticity of the fluid medium.

3. A fluid motor according to claim 2 in which said restricted passage is adjustably restricted.

References Cited by the Examiner
UNITED STATES PATENTS

| | | | |
|---|---|---|---|
| 1,221,862 | 4/1917 | Hultquist | 91—178 |
| 2,015,705 | 10/1935 | Bragg. | |
| 2,090,583 | 8/1937 | Morton | 91—318 |
| 2,229,394 | 1/1941 | Stinne. | |
| 2,262,432 | 11/1941 | Rodder et al. | |
| 2,442,101 | 5/1948 | Stone | 91—186 |
| 2,684,660 | 7/1954 | MacPherson. | |
| 2,802,424 | 8/1957 | Lee | 91—178 X |
| 3,046,951 | 7/1962 | Freeborn | 91—275 |

FOREIGN PATENTS

| | | |
|---|---|---|
| 1,090,670 | 4/1955 | France. |
| 1,206,752 | 2/1960 | France. |

FRED E. ENGELTHALER, *Primary Examiner.*

RICHARD B. WILKINSON, *Examiner.*